United States Patent [19]

O'Brien

[11] Patent Number: 5,628,020

[45] Date of Patent: May 6, 1997

[54] SYSTEM OSCILLATOR GATING TECHNIQUE FOR POWER MANAGEMENT WITHIN A COMPUTER SYSTEM

[75] Inventor: Rita M. O'Brien, Austin, Tex.

[73] Assignee: Advanced Micro Devices, Sunnyvale, Calif.

[21] Appl. No.: 680,556

[22] Filed: Jul. 9, 1996

Related U.S. Application Data

[63] Continuation of Ser. No. 160,931, Dec. 1, 1993, abandoned.

[51] Int. Cl.$^6$ ............................................. G06F 1/32
[52] U.S. Cl. ........................................ 395/750; 395/560
[58] Field of Search .............................. 395/750, 550; 364/707; 331/111

[56] References Cited

U.S. PATENT DOCUMENTS

| | | | |
|---|---|---|---|
| 4,039,973 | 8/1977 | Yamashiro | 331/116 |
| 4,267,527 | 5/1981 | Petrizio et al. | 331/111 |
| 4,293,927 | 10/1981 | Hoshii | 395/750 |
| 4,409,665 | 10/1983 | Tubbs | 395/750 |
| 4,727,339 | 2/1988 | Doty, II et al. | 331/173 |
| 4,758,945 | 7/1988 | Remedi | 395/750 |
| 4,851,987 | 7/1989 | Day | 395/750 |
| 5,153,535 | 10/1992 | Fairbanks et al. | 331/143 |
| 5,155,840 | 10/1992 | Niijima | 395/550 |
| 5,167,024 | 11/1992 | Smith et al. | 395/750 |
| 5,222,239 | 6/1993 | Rosch | 395/750 |
| 5,261,082 | 11/1993 | Ito et al. | 395/550 |
| 5,388,265 | 2/1995 | Volk | 395/750 |
| 5,454,114 | 9/1995 | Yach et al. | 395/750 |

FOREIGN PATENT DOCUMENTS

| | | |
|---|---|---|
| 94308628 | 6/1995 | European Pat. Off. . |
| 56-147220 | 2/1982 | Japan . |
| 02294760 | 12/1990 | Japan . |
| 03077113 | 6/1991 | Japan . |

OTHER PUBLICATIONS

Mroz, C.A., et al., "Advanced Clock Controller Cuts Power Needs Size of Static CMOS Systems", *Electronic Design*, (Oct. 1994), vol. 32, No. 220, pp. 185–191.

Primary Examiner—Ayaz R. Sheikh
Attorney, Agent, or Firm—Conley, Rose & Tayon P.C.; B. Noel Kivlin

[57] ABSTRACT

A system oscillator gating technique is provided for a power management unit of a computer system for controlling the application of power to a system oscillator. An output signal from the power management unit is provided to turn off the external system oscillator when the computer system is in a power-conserving suspend state and to turn on the external system oscillator on when the computer system resumes to a ready state. Counters are provided to control the latency of the output signal when the power management unit enters and exits the suspend state. This latency provides time for the microprocessor clock and/or other clock signals associated with the system oscillator to shut off prior to the oscillator shutdown and provides time for the oscillator to stabilize prior to the restarting of the clock signal. As a result, power consumption of the computer system may be reduced while proper clock generation for the computer system is maintained.

8 Claims, 2 Drawing Sheets

SYSTEM OSCILLATOR GATING TECHNIQUE FOR POWER MANAGEMENT WITHIN A COMPUTER SYSTEM

This is a Continuation of application Ser. No. 08/160,931, filed Dec. 1, 1993, now abandoned.

BACKGROUND OF THE INVENTION

1. Field of the Invention

This invention relates to computer systems and more particularly to power management techniques employed within computer systems.

2. Description of the Relevant Art

An on-going developmental goal of manufacturers has been to reduce the power consumption of computer systems. Reducing power consumption typically reduces heat generation of the system, thereby increasing reliability and decreasing costs. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMU's). One specific power reduction technique involves the capability of stopping clock signals that drive inactive circuit portions such as the microprocessor, a system memory, and a disk controller. A system employing such a technique typically includes a power management unit that detects or predicts when the microprocessor, the system memory, and the disk controller will be inactive, and accordingly stops the clock signals at appropriate times. By turning off "unused" clock signals that drive the inactive circuit portions, overall power consumption of the system is decreased. A similar technique involves removing the power supplied to the microprocessor, the system memory, and the disk controller when they are inactive.

Despite this, conventional computer systems do not remove power from the system oscillators during power management modes. Accordingly, in conventional computer systems, power is wasted when power is applied to the system oscillators when the corresponding clock signals are unused.

SUMMARY OF THE INVENTION

The problems outlined above are in large part solved by a computer system employing a system oscillator gating technique in accordance with the present invention. In one embodiment, digital hardware is utilized to control the removal and the reapplication of power to the system oscillator. Specifically, an output signal from a power management unit is provided to turn off the external system oscillator when the computer system is in a power-conserving suspend state and to turn on the external system oscillator on when the computer system resumes to a ready state. Counters are provided to control the latency of the output signal when the power management unit enters and exits the suspend state. This latency provides time for the microprocessor clock and/or other clock signals associated with the system oscillator to shut off prior to the oscillator shutdown and provides time for the oscillator to stabilize prior to the restarting of the clock signal. As a result, power consumption of the computer system may be reduced while proper clock generation for the computer system is maintained.

Broadly speaking, the present invention contemplates a computer system comprising an oscillator for generating a reference timing signal, a clock generator coupled to the oscillator and capable of generating a clock signal, and a system monitor for monitoring a circuit portion of the computer system and capable of generating a suspend state signal indicative of whether said circuit portion is inactive. A clock control unit is also provided that is coupled to the clock generator and to the system monitor, wherein the clock control unit is capable of stopping the clock signal in response to an assertion of the suspend state signal and is capable of restarting the clock signal in response to a deassertion of the suspend state signal. The computer system finally includes an oscillator power control unit coupled to the oscillator and to the system monitor, wherein the oscillator power control unit is capable of removing power supplied to the oscillator in response to an assertion of the suspend state signal.

The present invention further contemplates a power management unit connectable to a computer system including an oscillator for providing a timing reference signal. The power management unit comprises a system monitor for monitoring a circuit portion of the computer system and capable of generating a suspend state signal indicative of whether the circuit portion is inactive, a clock control unit coupled to the system monitor, wherein the clock control unit is capable of generating a clock suspend signal in response to an assertion of the suspend state signal, and an oscillator power control unit coupled to the system monitor. The oscillator power control unit is capable of generating an oscillator gating signal for controlling the application of power to the oscillator in response to the suspend state signal.

The present invention finally contemplates a power management method for removing and applying power to a system oscillator within a computer system comprising the steps of monitoring a circuit portion of the computer system, entering a suspend state if the circuit portion is inactive, stopping a clock signal in response to the step of entering the suspend state, and removing power from the system oscillator in response to the step of entering the suspend state.

BRIEF DESCRIPTION OF THE DRAWINGS

Other objects and advantages of the invention will become apparent upon reading the following detailed description and upon reference to the accompanying drawings in which.

Figure 1:
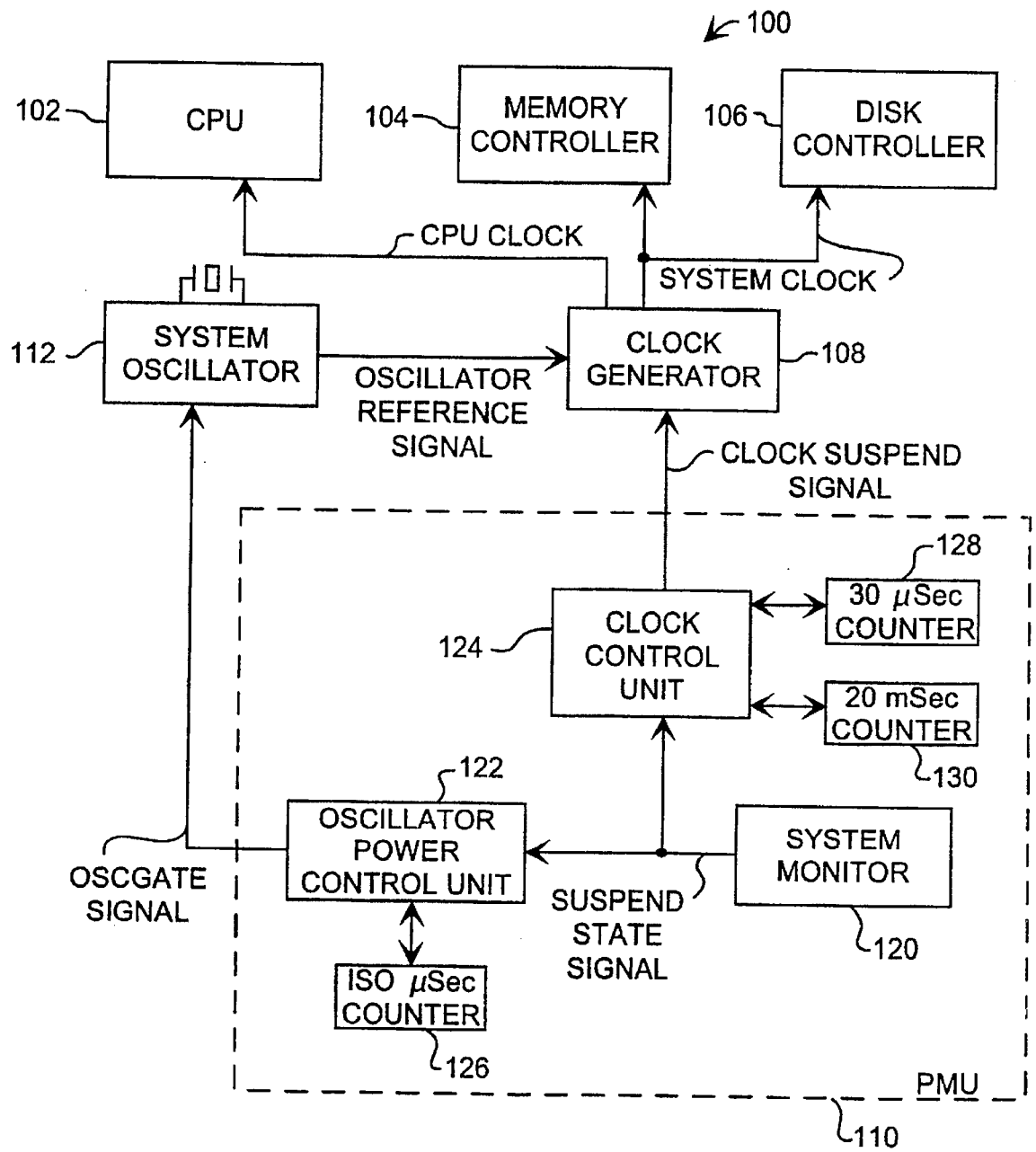
FIG. 1 is a block diagram of a computer system including a power management unit that implements a system oscillator gating technique in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a computer system 100 that implements a system oscillator gating technique according to the present invention. The computer system 100 includes a microprocessor (CPU) 102, a system memory controller 104, and a disk controller 106 each coupled to a clock generator 108. The computer system 100 further includes a power management unit (PMU) 110 and a system oscillator 112 coupled to clock generator 108.

System oscillator 112 is an oscillator circuit which, in the preferred embodiment, includes a crystal element and which generates an oscillator reference signal having a predetermined frequency. The oscillator reference signal is provided to clock generator 108. Using the oscillator reference signal, clock generator 108 generates a CPU clock signal that is provided to microprocessor 102 and a system clock signal that is provided to system memory controller 104 and to disk controller 106, among other things. It is noted that the CPU clock signal may have a different frequency from the system clock signal. For example, in one embodiment, the CPU clock signal has a maximum frequency of 80 MHz and the system clock signal has a maximum frequency of 40 MHz.

Power management unit 110 includes a system monitor 120 coupled to an oscillator power control unit 122 and to a clock control unit 124. A counter 126 is coupled to oscillator power control unit 122 and a pair of counters 128 and 130 are coupled to clock control unit 124.

During operation, system oscillator 112 generates an oscillator reference signal having a predetermined frequency of, for example, 80 MHz. Clock generator 108 uses this oscillator reference signal to generate the CPU clock signal and the system clock signal.

After computer system 100 has been powered-on, system monitor 120 monitors various subsystems of the computer system 100 such as the microprocessor 102, system memory controller 104, and disk controller 106, among other things. In one embodiment, system monitor 120 detects activity of the microprocessor and other system peripherals by detecting signal activity on the CPU local bus and/or a peripheral bus. A variety of specific implementations of system monitor 120 could be employed within power management unit 110, and exemplary system monitors are described in numerous publications of the known prior art. For example, an exemplary system monitor that detects inactive circuit portions of a computer system is described within U.S. Pat. No. 5,167,024 issued Nov. 24, 1992 to Smith et al. This patent is incorporated herein by reference in its entirety.

When system monitor 120 determines that the microprocessor 102, the system memory controller 104, and the disk controller 106 are inactive, system monitor 120 enters a suspend state during which a control signal identified herein as the suspend state signal is asserted. The suspend state signal is provided to oscillator power control unit 122 and clock control unit 124. As will be described in greater detail below, the oscillator power control unit 122 responsively asserts a control signal identified as the OSCGATE signal which causes the power to be removed from the system oscillator, and clock control unit 124 asserts a control signal identified as the clock suspend signal that causes the clock generator 108 to stop the CPU clock signal and the system clock signal.

Figure 2:
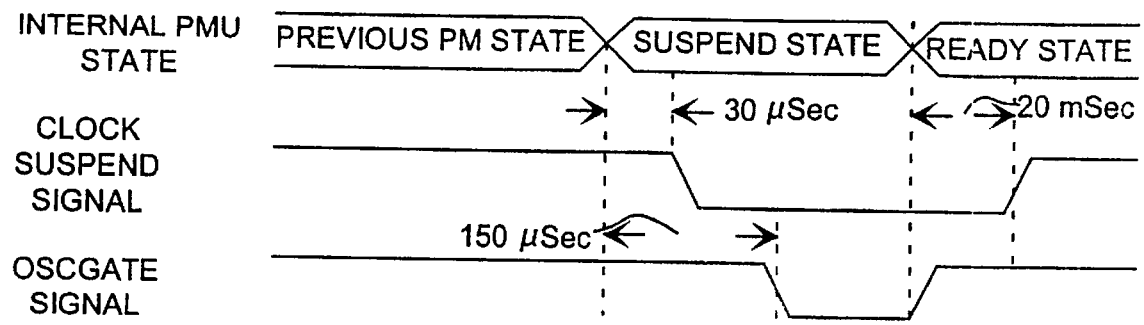
FIG. 2 is a timing diagram that illustrates the internal power management states of the power management unit and corresponding output control signals.

FIG. 2 is a timing diagram that illustrates the timing relationship between the internal states of system monitor 120 and the clock suspend and OSCGATE signals. Referring collectively to FIGS. 1 and 2, when system monitor 120 enters the suspend state and asserts the suspend state signal, the clock control unit 124 causes counter 128 to begin counting a period of 30 microseconds. When the 30 microsecond period elapses, clock control unit 124 asserts the clock suspend signal which causes clock generator 108 to stop the CPU clock signal and the system clock signal.

Oscillator power control unit 122 similarly causes the counter 126 to begin counting for a 150 microsecond period in response to the entrance of the suspend state by system monitor 120. After 150 microseconds have elapsed, oscillator power control unit 122 asserts the OSCGATE signal which causes power to be removed from system oscillator 112. Accordingly, the oscillator reference signal is no longer generated.

The power management unit 110 remains in the suspend state until system monitor 120 determines that the CPU clock signal and/or the system clock signal must be restarted. When such a determination is made by system monitor 120, the system monitor 120 enters a ready state. The suspend state signal is accordingly deasserted and oscillator power control unit 122 responsively deasserts the OSCGATE signal. When the OSCGATE signal is deasserted, power is reapplied to system oscillator 112, thereby allowing the generation of the oscillator reference signal.

In addition, also in response to the deassertion of the suspend state signal, clock control unit 124 causes counter 130 to begin counting a 20 millisecond period. When the 20 millisecond period has elapsed, clock control unit 124 deasserts the clock suspend signal, thereby causing clock generator 108 to restart the CPU clock signal and the system clock signal. It is noted that this 20 millisecond period as controlled by counter 130 allows the oscillator reference signal to stabilize before attempting to restart the CPU and system clock signals.

Figure 3:
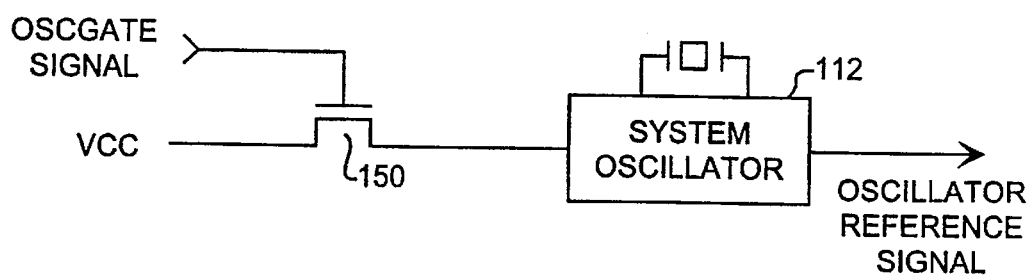
FIG. 3 is a schematic diagram that illustrates a gating circuit for removing and reapplying power to the system oscillator.

FIG. 3 illustrates a power gating circuit that allows power to be removed and reapplied to system oscillator 112 in response to the OSCGATE signal. As illustrated in the figure, an FET switching transistor 150 is coupled to a power supply VCC and the system oscillator 112. The OSCGATE signal is applied to the gate of transistor 150. It is noted that in the embodiment of FIG. 1, this switching circuitry is incorporated within system oscillator 112.

As a result of the computer system described above, the overall power consumption of the computer system can be reduced. In addition, the CPU and system clock signals are stopped before power is removed from the system oscillator to maintain proper generation of the clock signals and prepare the system for shut-down. In addition, power is reapplied to the system oscillator 112 before the clock signals are restarted to allow time for the oscillator reference signal to stabilize.

It is noted that the system oscillator gating technique described above may be used in conjunction with a variety of other power management techniques. For example, the system oscillator gating technique may be used in conjunction with the power management techniques taught within the copending, commonly assigned patent applications: "Interrupt Controller with In-Service Indication", by MacDonald et al., Ser. No. 08/125,336, filed Sept. 22, 1993; "power Management Control Technique for Timer Tick Activity Within An Interrupt Driven Computer System", by O'Brien et al., Ser. No., 08/156,888, filed Nov. 23, 1993; and "Disable Technique During Low Battery Conditions Within A Portable Computer System", by Wisor et al , Ser. No.

08/160,930, filed concurrently herewith and; issued Aug. 15, 1995 as U.S. Pat. No. 5,442,794. These patent applications are incorporated herein by reference in their entirety.

Numerous variations and modifications will become apparent to those skilled in the art once the above disclosure is fully appreciated. It is intended that the following claims be interpreted to embrace all such variations and modifications.

What is claimed is:

1. A computer system comprising:

an oscillator configured to generate a reference timing signal;

a clock generator coupled to said oscillator and configured to generate a clock signal responsive to said reference timing signal;

a system monitor configured to monitor a circuit portion of said computer system and configured to generate a suspend state signal indicative of whether said circuit portion is inactive;

a clock control unit coupled to said clock generator and to said system monitor, wherein said clock control unit is configured to stop said clock signal in response to an assertion of said suspend state signal and is configured to restart said clock signal in response to a deassertion of said suspend state signal;

a first counter coupled to said clock control unit configured to count a first predetermined time after said deassertion of said suspend state signal;

a second counter coupled to said clock control unit configured to count a second predetermined time after said assertion of said suspend state signal, wherein said clock control unit is configured to stop said clock signal said second predetermined time after said assertion of said suspend state signal;

an oscillator power control unit coupled to said oscillator and to said system monitor, wherein said oscillator power control unit is configured to remove power supplied to said oscillator in response to an assertion of said suspend state signal and is configured to restore power supplied to said oscillator in response to a deassertion of said suspend state signal, wherein said clock control unit is configured to restart said clock signal said first predetermined time after said deassertion of said suspend state signal and restoration of power to said oscillator; and a third counter coupled to said oscillator power control unit configured to count a third predetermined time after said assertion of said suspend state signal, wherein said oscillator power control unit is configured to remove power supplied to said oscillator said third predetermined time after said assertion of said suspend state signal, said third predetermined time being longer than said second predetermined time.

2. The computer system as recited in claim 1 further comprising a microprocessor coupled to said clock generator, wherein said clock signal is provided to said microprocessor.

3. The computer system as recited in claim 1 wherein said clock control unit is configured to generate a clock suspend signal that is provided to said clock generator, and wherein said clock generator is configured to stop said clock signal in response to an assertion of said clock suspend signal.

4. The computer system as recited in claim 1 wherein said clock control unit is configured to deassert said clock suspend signal said first predetermined time after said deassertion of said suspend state signal.

5. A power management unit connectable to a computer system including an oscillator, said power management unit comprising:

a system monitor configured to monitor a circuit portion of said computer system and configured to generate a suspend state signal indicative of whether said circuit portion is inactive;

a clock control unit coupled to said system monitor, wherein said clock control unit is configured to generate a clock suspend signal in response to an assertion of said suspend state signal and deassert said clock suspend signal in response to a deassertion of said suspend state signal;

a first counter coupled to said clock control unit configured to count a first predetermined time after said deassertion of said suspend state signal;

a second counter coupled to said clock control unit configured to count a second predetermined time after said assertion of said suspend state signal, wherein said clock control unit is configured to assert said clock suspend signal said second predetermined time after said assertion of said suspend state signal;

an oscillator power control unit coupled to said system monitor, wherein said oscillator power control unit is configured to generate an oscillator gating signal for controlling the application of power to said oscillator in response to said suspend state signal wherein said oscillator power control circuit is configured to restore automatically power supplied to said oscillator in response to said deassertion of said suspend state signal, wherein said clock control unit is configured to restart said clock signal said first predetermined time after said deassertion of said suspend state signal and restoration of power to said oscillator; and a third counter coupled to said oscillator power control unit for counting a third predetermined time after said assertion of said suspend state signal, wherein said oscillator power control unit is configured to assert said oscillator gating signal for removing power from said oscillator said third predetermined time after said assertion of said suspend state signal.

6. The power management unit as recited in claim 5 wherein said clock control unit is configured to provide said clock suspend signal to an output terminal of said power management unit for controlling the starting and the stopping of a clock signal.

7. The power management unit as recited in claim 5 wherein said clock control unit is configured to deassert said clock suspend signal said first predetermined time after said deassertion of said suspend state signal.

8. A power management method for removing and applying power to a system oscillator within a computer system comprising the steps of:

monitoring the activity of a circuit portion of said computer system;

entering a suspend state if said circuit portion is determined to be inactive;

stopping a clock signal to said circuit portion in response to said step of entering said suspend state;

waiting a first predetermined time after stopping said clock signal;

removing power from said system oscillator said first predetermined time after stopping said clock signal;

entering a ready state when said circuit portion becomes active;

reapplying power to said system oscillator in response to said step of entering said ready state; and restarting said clock signal in response to said step of entering said ready state, wherein said step of restarting said clock signal is performed automatically a second predetermined time after said step of reapplying power to said system oscillator.

* * * * *